Nov. 17, 1970  B. NYSTEN  3,540,086
SNAP FASTENERS
Filed Aug. 12, 1968
2 Sheets-Sheet 1
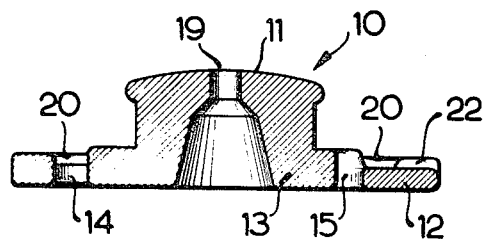
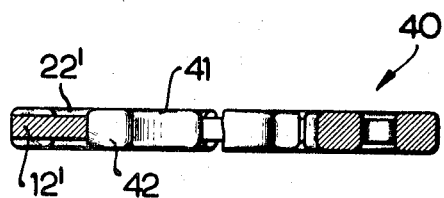
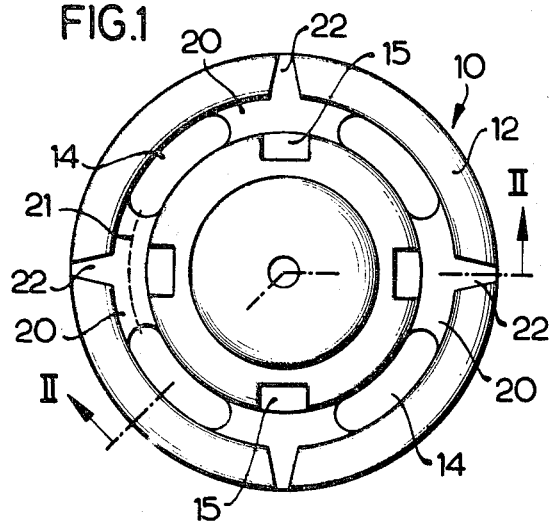
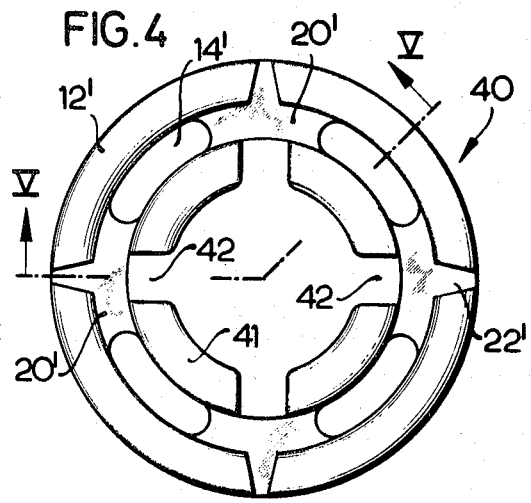
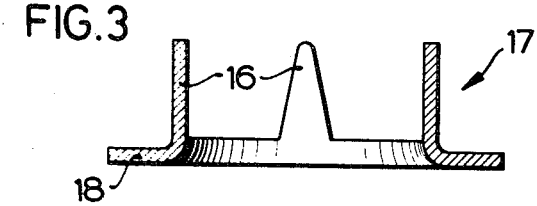
INVENTOR
BERNHARD NYSTEN
By: Michael S. Striker
Attorney

INVENTOR
BERNARD NYSTEN

By: Michael S. Striker
Attorney

United States Patent Office 3,540,086
Patented Nov. 17, 1970

3,540,086
SNAP FASTENERS
Bernhard Nysten, Aachen, Germany, assignor to William Prym-Werke KG, Stolberg, Rhineland, Germany, a firm
Filed Aug. 12, 1968, Ser. No. 751,809
Claims priority, application Germany, Aug. 11, 1967, 1,610,408
Int. Cl. A44b 17/00
U.S. Cl. 24—216                 10 Claims

ABSTRACT OF THE DISCLOSURE

A snap fastener in which the base plates of the female and male members of the snap fasteners are each provided in addition to a plurality of openings therethrough which serve for attaching the respective members by sewing to a fabric or the like. The respective members are also provided with a plurality of penetrable zones so that bendable prongs of attaching means may be extended therethrough so that the respective snap fastener member may be attached to the fabric by sewing threads, by the prongs of attaching means or by a combination of both.

BACKGROUND OF THE INVENTION

The present invention relates to a snap fastener in which the male as well as the female member of the snap fastener are formed from plastic material and in which the base plates of the two members of the snap fastener are provided with openings therethrough serving for attaching the respective member by sewing to a fabric or the like.

The known snap fasteners of the aforementioned kind have the disadvantage that the attaching of the members thereof to a fabric can only be carried out by sewing. Such snap fasteners are not usable for the attaching thereof to a fabric or the like by attaching means provided with prongs constructed to penetrate through the fabric and the base plate of the respective member of the snap fastener so that after bending the prongs over the base plate the respective member will be attached to the fabric. In snap fasteners of the last-mentioned kind in which the members of the snap fasteners are attached to the fabric by the prongs of attaching means, it is known to make the male and the female member of the snap fastener from plastic material. In the known snap fasteners of the last-mentioned kind, the base plates of the two members are however not provided with openings for extension of the prongs of the attaching means therethrough and the piercing of the solid base plate of the respective member by the prongs of the attaching means is therefore rather difficult. The last-mentioned snap fastener is not intended, nor suitable for attaching the members thereof by sewing to a fabric.

It is an object of the present invention to provide a snap fastener which may be attached either by sewing or by attaching means provided with prongs or by combination of both methods to a fabric or the like.

SUMMARY OF THE INVENTION

With these objects in view, the snap fastener according to the present invention mainly comprises a male member and a female member formed from plastic material, in which the male member has a base plate and a head projecting from the center of the base plate and the female member has a base plate formed with a central opening adapted to receive the head of the male member for releasably connecting the two members to each other. The base plate of each of the aforementioned members is provided according to the present invention with a plurality of spaced openings therethrough adapted to receive threads for sewing the base plate onto a fabric or the like and in addition to these openings the base plate of each member is formed with a plurality of penetrable zones angularly displaced from the openings for the extension of bendable prongs of attaching means therethrough so that the respective member may be attached by sewing, by the prongs of the attaching means or by a combination of both. This provides for a snap fastener which can be universally used.

The penetrable zones of the base plate in each member may be formed in two ways. One way to form the penetrable zone is to provide, in addition to the plurality of openings which serve for the extension of sewing threads therethrough, a second plurality of openings for the extension of the prongs of an attaching member therethrough. The other possibility of providing penetrable zones is to form in the base plate of the respective member weakened portions which can be easily pierced by the prongs of the attaching means.

Especially advantageous is an arrangement in which the openings in each base plate serving to receive the sewing threads are connected with each other by groove segments formed in the respective base plate so that the thread portions between the openings will be located in the groove segments and not project beyond the upper face of the base plate.

Even though, due to the use of plastic material for the members of the snap fastener, the bent-over prongs may be pressed into the material of the base plate, it is preferred to form in the base plate of each member for each of the penetrable zones a groove in the base plate extending outwardly in radial direction from the respective zone for receiving of the bent-over prong end. These radial grooves preferably conform to the shape of the bent-over prong ends. The side faces of these grooves will thereby serve to guide the prong ends during the bending thereof.

It is also preferred to arrange the penetrable zones for the prongs of the attaching means radially spaced from the outer periphery of the respective base plate and to bend the prongs outwardly toward the periphery of the respective base plate. This arrangement of the penetrable zones for the prongs of the attaching means assures that the member is held to the fabric or the like closely adjacent to the center of the respective member. The forces occurring during use of the snap fastener will be transferred from the central portion of one snap fastener member to the central portion of the other snap fastener member and by arranging the penetrable zones for the prongs of the attaching means for the members distant from the periphery of the respective base plate and closely adjacent to the central portion thereof, the strength of the whole arrangement will be improved. By bending the prongs of the attaching means outwardly toward the periphery of the base plate, the central portion of the respective snap fastener member will remain free for an appropriate construction of the engaging faces thereof and the proper function of the snap fastener will not be impeded by the bent prongs.

In the female snap fastener member it is advantageous to provide radially slots at the central opening thereof so as to increase the elastic deformability of the base plate during engagement of the head portion of the male member in the central opening of the female member of the snap fastener, and preferably these radial slots serve at the same time as penetrable zones for the prongs of the attaching means. In this case the radial slots in the base plate of the female member will accomplish two functions.

The arrangement of the penetrable zones for the prongs of the attaching means and the openings for receiving the threads for sewing the base plate onto a fabric may be made in such a manner that the openings and the penetrable zones have the same radial distance from the center of the respective member of the snap fastener. This permits to exchange the function of the openings and the penetrable zones as the prongs of the attaching means may be pushed through the openings or through the penetrable zones since both are arranged at the same radial distance from the center and at equal distances from each other.

In certain cases it is however preferred that only the penetrable zones may be used to push the prongs of the attaching means therethrough, and this can be obained by arranging the penetrable zones at a different radial distance from the center of the base plate than the openings for the attaching threads.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a top view of a male member according to the present invention;

FIG. 2 is a cross-section of the male member shown in FIG. 1 taken along the line II—II of FIG. 1;

FIG. 3 is a cross-section through the annular attaching means according to the present invention;

FIG. 4 is a top view of a female attaching member adapted to cooperate with the male member shown in FIGS. 1 and 2;

FIG. 5 is a cross-section of the female member shown in FIG. 1 taken along the line V—V of FIG. 4;

DESCRIPTION OF THE PREFERRED EMBODIMENTS

Figure 8:
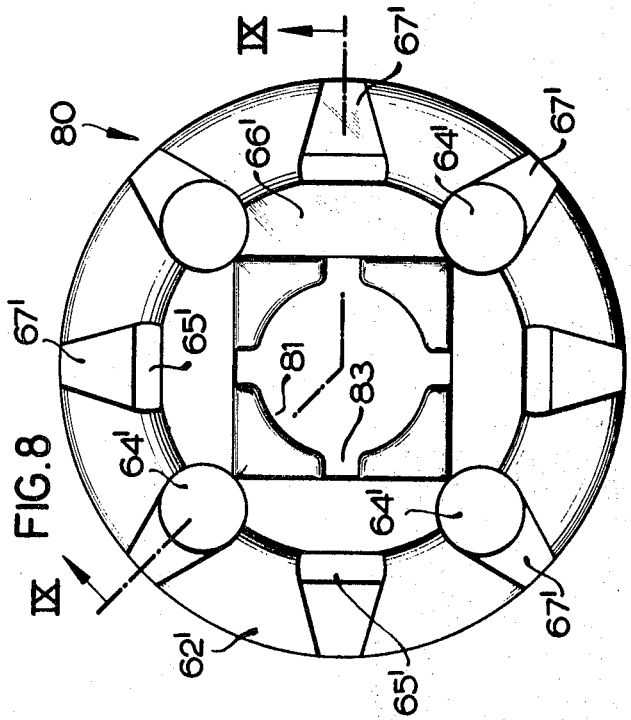
FIG. 8 is a top view of another embodiment of a female member according to the present invention adapted to cooperate with the male member shown in FIGS. 6 and 7.

The male snap fastener member 10 illustrated in FIGS. 1 and 2 has a bulbous head 11 projecting centrally from a base plate 12. The base plate 12 is adapted to abut with its bottom face 13 on a carrier such as a fabric or the like. For attaching the male member 10 to a fabric or the like, the base plate 12 is provided with four openings 14 for the extension of a sewing thread therethrough and with four penetrable zones 15 for the extension of the prongs 16 of an attaching member or attaching means 17, as shown in FIG. 3, through the zones 15. It is to be understood that the term "penetrable zones" is used in the specification and the claims to designate either preformed openings through the base plate for the prongs of the attaching means or weakened portions of the base plate which can be easily pierced by the prongs.

The openings 14 are arranged uniformly spaced from each other and at equal distance from the center 19 of the male snap fastener member and connected to each other by groove segments 20. The groove segments 20 and the openings 14 therebetween are arranged in an annular zone concentric with the center of the base plate. After sewing the male member 10 to a fabric or the like, the threads between adjacent openings 14 will be arranged in the respective groove section 20 as indicated by the dotted line 21 in FIG. 1.

The penetrable zones 15 are formed, in the embodiment shown in FIG. 1, as preformed openings through the base plate and they are arranged at a smaller radial distance from the center 19 than the openings 14. As shown in FIG. 1, a radially outwardly extending trapezoidal groove 22 is provided for each of the openings 15 and the depth of these radial grooves 22 is equal to that of the ring segments 20, as clearly shown in FIG. 2.

The head 11 of the male snap fastener member is preferably provided with a central cavity which opens at 19 at the top surface of the head 11 in order to increase the elasticity of the head.

The attaching means 17 shown in FIG. 3 are preferably formed by an annular flange 18 and four prongs 16 projecting upwardly from the inner periphery of the flange and being adapted to penterate a fabric, not shown in the drawing, to which the respective snap fastener member is to be attached and through the penetrable zones 15 of the male member 10, whereafter the upper portions of the prongs 16 are outwardly bent into the trapezoidal grooves 22 on the upper surface of the base plate 12. Instead of attaching the member 10 by the attaching means 17 or in addition thereto, the member 10 may also be fastened to the fabric by sewing, i.e. by threads extending through the openings 14.

The female snap fastener member 40, shown in FIGS. 4 and 5, has a base plate 12' which is similarly constructed as that of the male member 10 and corresponding portions of the base plate 12' are designated with the same reference numerals to which a prime is added.

The base plate 12' has openings 14' for the attaching threads which are connected to each other by groove segments 20' from which four angularly displaced trapezoidal radial grooves 22' extend outwardly. Engaging faces 41 surround the central opening of the female member 14 and are adapted to cooperate with corresponding faces on the head portion 11 of the male member during engagement of the head in the central opening. In order to increase the elasticity of the engaging faces 41, the latter are divided by radial slots 42 in a plurality of ring sections. The slots 42 are respectively aligned with the trapezoidal grooves 22' on the base plate 12' and the slots 42 form in this case the penetrable zones for the prongs 16 of attaching means 17 such as shown in FIG. 3. In this way, the prongs 16 may be arranged very closely to the engaging faces 14 and, by bending the prongs toward the outer periphery of the base plate 12', the prongs will be arranged in the radial grooves 22' so that the prongs will not hinder the proper engagement of the engaging faces 41 with the corresponding faces on the head of the male member 10.

As clearly shown in FIG. 5, the top side and the bottom side of the female member 40 are equally constructed so that the female member may abut with either side thereof against the carrier or fabric.

Figure 6:
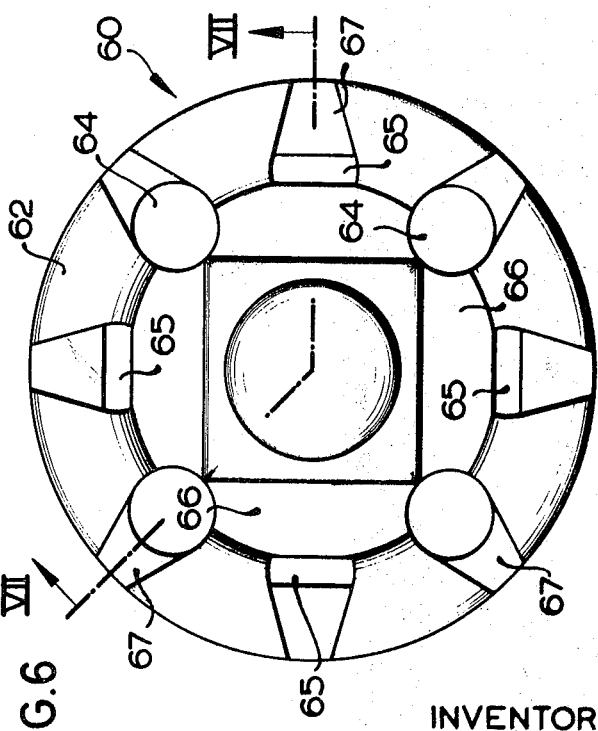
FIG. 6 is a top view of another embodiment of a male member according to the present invention.
Figure 7:
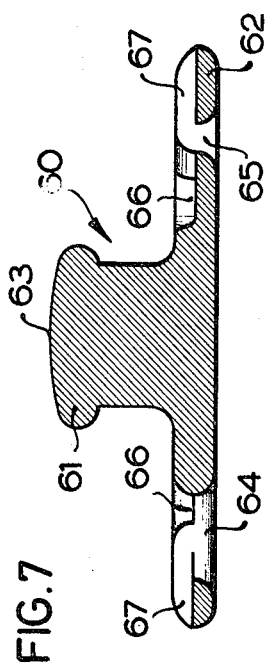
FIG. 7 is a cross-section taken along the line VII—VII of FIG. 6.

FIGS. 6 and 7 illustrate another embodiment of a male member 60 according to the present invention. The base plate 62 of the male member 60 is provided with four openings 64 for the penetration of sewing threads therethrough and in addition with four penetrable zones 65 formed here also as preformed openings for the penetration of the prongs of attaching means, such as shown in FIG. 3, therethrough. In this embodiment the openings 64 and the additional openings or penetrable zones 65 are arranged at the same radial distance from the center 63 of the bulbous head 61 which projects from the center of the base plate of the male member.

Adjacent openings 64 are connected to each other by a groove segment or depression 66 adapted to receive thread portions of attaching threads extending through adjacent openings 64. Since the openings 64 are at the same radial distance from the center 63 of the male member 60 as the penetrable zones opening 65, the latter are also connected by the grooves or depressions 66 to each other.

Even though the circular openings 64 are better adapted for guiding sewing threads therethrough than the penetrable zones or openings 65 of rectangular outline, it would also be possible to use the openings 65 for the extension of sewing threads therethrough, since adjacent openings 65 are also connected by the depressions or grooves 66, as clearly shown in FIG. 6.

In a similar manner it is also possible to use the openings 64 for the penetration of the prongs of attaching means therethrough and for this purpose radially extending grooves 67 for receiving the bent-over ends of the prongs in this embodiment provided at the openings 64 as well as at the openings 65. In this way it is also possible to attach the member 60 by means of a pair of attaching means, such as shown in FIG. 3, which have each four prongs.

Figure 9:
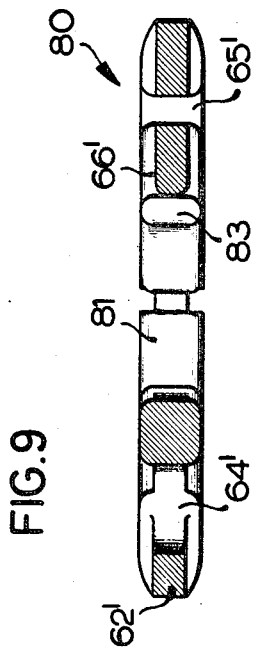
FIG. 9 is a section taken along the line IX—IX of FIG. 8.

FIGS. 8 and 9 illustrate a female member 80 adapted to cooperate with the male member 60 illustrated in FIGS. 6 and 7.

The base plate 62' of the female member 80 is constructed similar to that of the male member 60 and corresponding portions are therefore designated with the same reference numerals to which a prime has been added.

The shape and arrangement of the openings 64' for the penetration of sewing threads therethrough, the penetrable zones or openings 65' for the prongs of the attaching means, the depressions or groove sections 66' as well as the trapezoidal radially outwardly extending groove 67' are arranged in the same manner as in the embodiment shown in FIG. 6.

The engaging faces 81' forming in the base plate 62' a central opening are, in order to increase the elasticity of the base plate, provided with radial slots 83.

The top and the bottom side of the female member 80 is constructed in the same manner, as evident from FIG. 9, so that the female member 80 may be used abutting with one or the other side on the carrier or fabric to which it is to be attached.

It will be understood that each of the elements described above, or two or more together, may also find a useful application in other types of snap fasteners differing from the types described above.

While the invention has been illustrated and described as embodied in a snap fastener, it is not intended to be limited to the details shown, since various modifications and structural changes may be made without departing in any way from the spirit of the present invention.

Thus, the number of openings and penetrable zones and their arrangement relative to each other may be different from that shown in the various figures. As mentioned before, the penetrable zones for the prongs of the attaching means may either be constituted by preformed openings or by weakened portions of the base plate of the respective member which may be easily pierced by the prongs of the attaching means.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and therefore, such adaptations should and are intended to be comprehended within the meaning and range of equivalence of the following claims.

What is claimed as new and desired to be protected by Letters Patent is set forth in the appended claims:

1. A snap fastener comprising, in combination a male member and a female member formed from plastic material, said male member having a base plate and a head projecting from the center of said base plate and said female member having a base plate formed with a central opening adapted to receive said head, the base plate of each of said members being provided with a plurality of spaced openings therethrough adapted to receive threads for sewing the base plate onto a carrier such as a fabric, and with a plurality of penetrable zones angularly displaced from said openings for the extension of bendable prongs of attaching means therethrough so that the members may be attached to a carrier by sewing threads, by the prongs of attaching means, or by threads and prongs, and including a radially extending groove for each of said penetrable zones adapted to receive a bent-over portion of a prong.

2. A snap fastener as defined in claim 1, wherein said plurality of penetrable zones are constituted by a second plurality of preformed openings.

3. A snap fastener as defined in claim 2, wherein said second plurality of openings in said female member are formed by a plurality of slots extending radially outwardly from said central opening so that the elastic deformability of the base plate during engagement of the head of said male member in the central opening of the female member is increased.

4. A snap fastener as defined in claim 1, wherein said plurality of penetrable zones are constituted by a plurality of weakened portions in said base plate which can be easily pierced by prongs of attaching means.

5. A snap fastener as defined in claim 1, and including a plurality of groove segments extending between said openings.

6. A snap fastener as defined in claim 5, wherein said penetrable zones are located radially inwardly from the periphery of the respective base plate and wherein each of the radially extending grooves for receiving a bent-over portion of a prong extends radially outwardly from the respective zone to the periphery of the respective base plate.

7. A snap fastener as defined in claim 1, wherein each of said penetrable zones is arranged between a respective pair of said plurality of openings and at the same radial distance from the center of the respective base plate as said openings.

8. A snap fastener as defined in claim 1, wherein said penetrable zones and said openings are arranged in alternating sequence about the center of each base plate and wherein said zones are radially displaced from said openings.

9. A snap fastener as defined in claim 8, wherein said zones are arranged radially closer to the center of the respective base plate than said openings.

10. A snap fastener comprising, in combination, a male member and a female member formed from plastic material, and attaching means for each of said members, said attaching means having an annular base and a plurality of bendable prongs projecting spaced from each other from said annular base, said male member having a base plate and a head projecting from the center of said base plate and said female member having a base plate formed with a central opening adapted to receive said head, the base plate of each of said members being provided with a plurality of spaced openings therethrough adapted to receive threads for sewing the base plate onto a carrier such as a fabric, and with a plurality of penetrable zones angularly displaced from said openings for the extension of the prongs of the respective attaching means therethrough so that by bending said prongs after their extension through said zones, the base plate of the respective member may also be attached to the carrier, whereby each of the members may be attached to a carrier by sewing threads, by the bent-over prongs of the attaching means, or by the threads and the prongs of the attaching means.

References Cited

UNITED STATES PATENTS

| | | | |
|---|---|---|---|
| 1,059,979 | 4/1913 | Cliff | 24—216 |
| 1,690,666 | 11/1928 | Carr | 24—216 |
| 2,368,100 | 1/1945 | Boenecke | 24—216 |
| 3,152,376 | 10/1964 | Boser et al. | 24—216 |

STEPHEN J. NOVORAD, Primary Examiner